UNITED STATES PATENT OFFICE.

JOKICHI TAKAMINE, OF NEW YORK, N. Y., AND JOKICHI TAKAMINE, JR., OF CLIFTON, NEW JERSEY.

ENZYMIC SUBSTANCE AND PROCESS OF MAKING THE SAME.

1,391,219.   Specification of Letters Patent.   Patented Sept. 20, 1921.

No Drawing.   Application filed January 23, 1918. Serial No. 213,431.

*To all whom it may concern:*

Be it known that we, JOKICHI TAKAMINE and JOKICHI TAKAMINE, Jr., subjects of the Emperor of Japan, and residing, respectively, in the city, county, and State of New York, and Clifton, county of Passaic, State of New Jersey, have made a certain new and useful invention in Enzymic Substance and Processes of Making the Same, of which the following is a specification.

This invention relates to enzymic substances, and the process of making the same.

The object of the invention is to produce an enzymic substance suitable for use in various lines of industry where the enzymic property of the substance is to be utilized.

A further object of the invention is to produce an enzymic substance for use in the industrial arts, which is stable and can be preserved without deterioration.

A further object is to produce an enzymic substance of the nature referred to from a fungus growth.

Other objects of the invention will appear more fully hereinafter.

The invention consists in the mode of procedure and the product having the charactertistics hereinafter more fully set forth and finally pointed out in the appended claims.

In carrying out our invention the seed spores of suitable microscopic fungi are sown on suitable culture media and propagated under suitable conditions of temperature, humidity and handling and for a suitable period of time, for the fungus to attain that stage in which it develops its greatest enzymic power. The enzymic substances contained in the fungus are then extracted by suitable solvents and by suitable treatment so as to obtain an enzymic product for use in the industrial arts, as we will more fully explain hereinafter.

The seed spores of the fungi genera *Aspergillus, Pennecillium* or *Mucor*, and, particularly the seed spores of the species *Eurotium oryzae,* are suitable for the purposes or our invention.

Comminuted or broken grains of the cereals, such as wheat, corn, oats, barley, &c., and preferably such broken or comminuted grains from which the greater part of the starchy matter has been removed, leaving the broken or comminuted parts in the form of bran, shorts, middlings, &c., and particularly wheat bran, constitute suitable media upon which the fungus may be propagated. Other media may be employed for this purpose such as slop from alcoholic distillation, residue from beer brewing, oil cake, brans, slops, and residue from sugar, glucose, and starch factories, and the like.

The mass or culture medium to be employed is first suitably moistened with water and thoroughly sterilized. This may be accomplished with steam. The seed spores of the desired fungus are sown upon the sterilized mass while the latter is in a moistened state, preferably containing from thirty to sixty per cent. of moisture. The sterilizing of the mass is not essential and may be omitted although a more abundant and healthier growth of fungus is secured and a greater development of enzymic power attained by first sterilizing the culture medium. In the sterilizing operation bacteria contained in the culture medium, and which tend to cause undesirable fermenting or decomposing action in the enzymic substance when produced by the subsequent treatment of the mass, are more or less destroyed or rendered inert.

After sowing the fungus seed spores upon the culture medium the entire mass is bedded up to a thickness of from six to twenty-four inches. In the case of wheat bran, shorts, middlings, &c., the bedding up of the mass is not essential. The mass is maintained in a moist atmosphere and at a uniform temperature not to exceed 45° C. There are different methods of carrying on the propagation and development of the fungus growth. One is the "still growth" method. Another is growing in motion. In the case of "still growth" the mass is spread to a thickness of from one to two inches and the fungus allowed to develop and grow. In the motion growing method the mass which may vary in thickness up to two or three feet, is constantly maintained in motion by stirring or otherwise in such manner as to cause every portion of the mass to be exposed to the air and to the cooling effect of the air, thereby preventing the mass from developing too great a heat. In the course of from eight to twenty hours the spores begin to sprout and within twenty to thirty hours the growth of fungus becomes abundant. Carbonic acid gas and heat are evolved during this period. Within thirty to sixty hours enzymic properties are developed in the culture medium by the growth of the fungus. The enzymes produced are mostly soluble in water and possess various characteristics such as diastatic, proteolytic, fat-splitting, milk-coagulating, and the like. The relative proportions of these characteristics or properties vary with different species of spores employed, and also, to more or less extent, according to the temperature, humidity, handling, and other conditions observed during the propagation and growth of the fungus.

The various enzymes are separated from the mass. Being soluble in water this separation of the enzymes may be effected by lixiviating the mass with water. The solution thus obtained may be concentrated in any convenient manner. For example, a desirable degree of concentration may be effected by percolating the same aqueous solution through successive batches or masses of the culture medium upon which the fungus has been grown.

Of the enzymes contained in the solution thus obtained diastatic enzyme usually predominates, followed by proteolytic, milk-coagulating, fat-splitting, and others, cited in their relative strength.

The solution or extract obtained as described is suitable for use in many industrial arts, for example, for destarching woven cotton fabrics, where utilization is made of its property of rendering starch soluble, that is, its diastatic property; degumming silk fibers and woven goods, where utilization is made of its proteolytic property; in bread making, where utilization is made of its powers of liquefying and saccharifying starch; and for numerous other purposes where enzymes are useful, required or desired. This solution, however, is more or less unstable, that is, in a comparatively limited period of time decomposition sets up therein, resulting in various kinds of fermentation, which greatly impairs, if not actually destroys the valuable enzymic properties of the solution. This is a serious objection since it necessitates the use of the solution as soon as it is made and consequently a fresh quantity must be made up each time it is required for use, and this imposes a serious drawback upon the practical availability of the enzymic solution or substance.

Even after evaporation of the solution, under a vacuum or otherwise, to a syrupy or semi-solid state, decomposition and consequent fermentation still takes place, and moreover, during evaporation a large percentage of enzymic power is lost either by decomposition or by the heat applied during evaporation.

It is among the special purposes of our invention to produce an enzymic substance of the nature referred to which is stable and can be preserved without decomposition and fermentation and without impairing the enzymic power thereof.

We have discovered that decomposition and resulting fermentation in the enzymic substance is produced by the presence therein of undesirable spores and bacteria which are washed out from the culture medium along with the enzymes. These spores and deleterious bacteria are eliminated and removed from the solution in accordance with our invention. This elimination may be effected in various ways. One efficacious and convenient way is to secure a concentrated solution by employing the extract obtained from one portion of culture medium to effect extraction from successive portions of such medium until the extract contains from fifteen to thirty per cent. of solid matter, where wheat bran, shorts, middlings, or combinations of such materials are employed for the culture medium.

To a given quantity of the enzymic solution an inert silicious material such as infusorial earth, fullers' earth, or other similar material in the proportion of one-tenth of one per cent. to two per cent. is added. The infusorial earth, or other similar material employed, should be first thoroughly sterilized. The mass is thoroughly stirred or agitated and is then filtered by suitable means. The filtering operation is repeated as often as may be required until a perfectly clear transparent solution is obtained. The elimination of the spores and bacteria thus accomplished leaves a solution possessing the desired enzymic power and which is suitable for use and in which decomposition and fermentation will not occur rapidly, and which, therefore, can be preserved for a considerable period of time without deterioration. It some times occurs that even after repeated filtering some deleterious bacteria still remain in the solution. To secure a still more stable solution which can be preserved without deterioration it is necessary to sterilize or render all bacteria contained therein inert. The difficulty in accomplishing this resides in the danger of impairing the enzymic power of the substance. Sterilizing antiseptics such as formaldehyde, sulfurous acid, and other suitable bactericides may be used for the purpose, but the danger in the use of such antiseptics is that if a sufficient quantity of antiseptic is used to thoroughly effect sterilization of the undesirable bacteria contained in the enzymic solution, the enzymic power of the solution is materially impaired if not altogether destroyed. The solution may also be heated to a usual pasturizing temperature, say to about 60° C., or higher. While this temperature is effective in killing the injurious bacteria it also acts to greatly impair, if not destroy, the enzymic power of the solution. In other words an antiseptic in sufficient quantity, or a temperature of sufficiently high degree, to insure elimination of the injurious effects of undesired bacteria present in the solution, also greatly reduces the value of the solution by diminishing its enzymic power if not actually destroying such power. While, therefore, an antiseptic, such as formaldehyde, or sulfurous acid in the proportion of a small fraction of one per cent., added to the clear transparent solution aids in increasing the stability of the solution, we have discovered, that by a novel and proper combination of antiseptic in suitable quantity, and the application of a proper amount of heat, the joint effect of the two agencies, when properly applied under proper conditions, we are able to secure the best results in obtaining the desired effect of stability of the enzymic substances, without injury to the enzymic power thereof. In practice we have found that the best results are attained when a small percentage, say one part of antiseptic, sulfurous acid, for example, in from one to ten thousand parts of the filtered transparent clear enzymic substance is added to the latter and thoroughly mixed therein, and the mixture is then heated to say 45° C. We have found that this relative quantity of antiseptic alone, nor this degree of heat alone, is not sufficient to kill the bacteria, nor to substantially impair the enzymic power of the enzymic substance, but the combination of the two conditions of heat and antiseptic referred to, is sufficient to render the enzymic substance stable and capable of being preserved for future use in perfect condition and without impairment of its enzymic power. We prefer to preserve the enzymic substance obtained and treated as above described, free from contaminating or decomposing influences by properly sterilizing and sealing the containers in which it is preserved.

In practice, the enzymic substance, in the form of a solution, into which the desired amount of antiseptic is mixed, is passed through a coil, say of copper, which is kept in water heated to the required temperature. After passing through a desired length of the coil, say one hundred feet, the solution is delivered into a sterilized container, which, when full, is properly sealed to exclude outer contamination.

The product obtained is a clear transparent dark amber colored liquid having a somewhat nutty taste, with a slightly musty odor, the color, taste and odor varying somewhat according to the degree of concentration of the liquid. It contains from 15% to 25% or more solid matter consisting of organic and mineral substances in about the proportion of 90% organic and 10% mineral. It possesses strongly diastatic and other enzymic properties and has the power of converting gelatinized starch into soluble starch, and then into various forms of dextrins, and eventually into sugars. The different stages of these conversions may be rendered visible by the addition of a weak solution of iodin to the mixture of starch and the enzymic solution. The starch itself gives an insoluble blue color while the stage of soluble starch is indicated by a soluble blue color which changes into various stages of purple to brown as the converting action progresses, the color eventually disappearing when the stage of sugars is reached in the conversion. The enzymic solution when obtained from a culture medium of wheat, bran, or other similar material, suitably sterilized, gives no coloration when an alcoholic solution of gum guayacol and hydrogen peroxid is added thereto. This is a characteristic which distinguishes this enzymic solution from a solution obtained from malt or germinated grain which would, in like case, give a blue color. Phosphate constitutes a large percentage of the mineral content of the enzymic solution, whereas an enzymic solution obtained from malt contains a comparatively small quantity of phosphate. As compared with the ordinary malt extract of commerce the enzymic solution of our invention contains a comparatively small amount of sugar and a comparatively large amount of proteid organic matter.

The proteolytic properties of the enzymic substance of our invention are shown by the digesting action it exerts upon chopped meat. Within a short period of time after the enzymic substance is added to the meat, say within about five minutes, digestion of the meat starts in, peptones being formed at first followed by amino acids, &c.

The milk coagulating property of the substance is easily demonstrated by the addition of a small amount of the substance, say from one to two per cent., to the milk. The milk coagulates to whey and eventually into cheese, a good cheese forming in about one hour, the time required varying somewhat according to the temperature.

The fat-splitting property of the enzymic substance of our invention is shown by adding the same to fat which is thereby transformed into glycerin and fatty acids. This action, however, is comparatively weak.

Having now set forth the objects and nature of our invention and the manner of carrying the same into practical use, what we claim as new and useful and of our own invention, and desire to secure by Letters Patent, is,—

1. The process which consists in propagating a fungus upon a culture medium, then extracting the soluble content of the mass, then adding an inert silicious substance to the extract and filtering the same to produce a transparent clear solution and then rendering said solution free from any deleterious bacteria remaining in said solution.

2. The process which consists in propagating a fungus upon a culture medium, then extracting the soluble content of the culture medium having the fungus growth thereon, then adding an antiseptic to the extract and subjecting the resulting mixture to a comparatively low heat.

3. The process which consists in propagating a fungus upon a culture medium, then extracting the soluble content of the culture medium having the fungus growth thereon, and finally adding sulfurous acid to the extract.

4. The process which consists in propagating a fungus upon a culture medium, then extracting the soluble content of the culture medium having the fungus growth thereon, and finally subjecting the extract to the combined effect of heat and an antiseptic.

5. The process which consists in propagating a fungus upon a culture medium, then extracting the soluble content of the culture medium having the fungus growth thereon, then mixing sulfurous acid with the extract and heating the mixture.

6. The process which consists in propaating a fungus upon a culture medium, and extracting with water the soluble content of the resulting mass, then filtering the extract, and mixing sulfurous acid therewith and heating the mixture to a temperature insufficient to impair the enzymic power of the solution.

7. The process which consists in propagating a fungus upon a culture medium, and extracting with water the soluble content of the resulting mass, then filtering the extract, and finally mixing with the filtered solution an antiseptic in insufficient quantity and heating the mixture to an insufficient degree to impair the enzymic power of the solution.

8. The process which consists in propagating a fungus upon a culture medium, then extracting the soluble content of the mass, then filtering the extract into a transparent clear liquid and finally subjecting the liquid to the combined action of an antiseptic and heat.

9. The process which consists in propagating a fungus upon a culture medium, then successively extracting the soluble content of different portions of the mass with the same liquid, and finally subjecting the extract to the combined action of an antiseptic and heat.

10. The process which consists of propagating a fungus upon a culture medium, then lixiviating said mass with water, and concentrating the same, and finally stabilizing the concentrate.

11. The process which consists of propagating a fungus upon a cuture medium, then lixiviating said mass with water and concentrating the same, and finally stabilizing the concentrate by subjection to the action of heat and an antiseptic.

12. The process which consists of propagating a fungus upon a culture medium, then lixiviating said mass with water, and concentrating the same to a clear extract, then stabilizing said extract by removing any remaining deleterious organisms.

13. The process which consists of propagating a fungus upon a culture medium, then lixiviating said mass with water, and concentrating the same to a clear extract, then stabilizing said extract by removing any remaining deleterious organisms by the action of an antiseptic at suitable temperature.

14. As an article of manufacture an enzymic substance comprising an aqueous extract from a mass of culture medium on which a fungus growth has been propagated and from which extract the decomposing or fermenting bacteria have been removed, and containing an antiseptic.

15. As a new article of manufacture an enzymic solution comprising an aqueous extract from a mass of culture medium on which a fungus growth has been propagated and containing sulfurous acid.

16. As a new article of manufacture a stable enzymic solution is clear and transparent and free from decomposing or fermenting bacteria, of slightly nutty taste and musty odor, possessing strongly diastatic and other enzymic properties, gives no coloration when an alcoholic solution of gum guayacol and hydrogen peroxid is added thereto, and contains a large amount of phosphate as a mineral constituent, a comparatively small amount of sugar and a fairly large amount of proteid organic matter.

17. As a new article of manufacture, a stable enzymic solution free from decomposing or fermenting bacteria, and which is clear and transparent, of slightly nutty taste and mutty odor, possessing strongly diastatic and other enzymic properties, gives no coloration when an alcoholic solution of gum guayacol and hydrogen peroxid is added thereto.

18. As a new article of manufacture, a stable, non-fermenting enzymic, amber colored solution, characterized by a somewhat nutty taste and musty odor, and possessing strongly diastatic and other enzymic properties.

19. As a new article of manufacture an enzymic solution comprising an aqueous extract from a mass of culture medium on which a fungus growth has been propagated, said extract being high in phosphates, free from deleterious organisms and possessing marked diastatic and proteolytic properties.

In testimony whereof we have hereunto set our hands on this 22nd day of January, A. D. 1918.

JOKICHI TAKAMINE.
JOKICHI TAKAMINE, Jr.